(12) United States Patent
Levy et al.

(10) Patent No.: US 10,417,097 B2
(45) Date of Patent: Sep. 17, 2019

(54) SYSTEM AND METHOD FOR CREATING SELECTIVE SNAPSHOTS OF A DATABASE

(71) Applicant: HUAWEI TECHNOLOGIES CO., LTD., Shenzhen, Guangdong (CN)

(72) Inventors: Eliezer Levy, Hod Hasharon (IL); Antonios Iliopoulos, Munich (DE); Shay Goikhman, Hod Hasharon (IL); Israel Gold, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/700,564

(22) Filed: Sep. 11, 2017

(65) Prior Publication Data
US 2017/0371748 A1 Dec. 28, 2017

Related U.S. Application Data

(63) Continuation of application No. PCT/EP2015/075405, filed on Nov. 2, 2015.

(30) Foreign Application Priority Data

May 13, 2015 (EP) .................................. 15167493

(51) Int. Cl.
*G06F 12/1009* (2016.01)
*G06F 11/14* (2006.01)
(Continued)

(52) U.S. Cl.
CPC ...... *G06F 11/1451* (2013.01); *G06F 11/1407* (2013.01); *G06F 12/1009* (2013.01);
(Continued)

(58) Field of Classification Search
CPC .... G06F 12/10; G06F 22/656; G06F 12/1009; G06F 16/24542
See application file for complete search history.

(56) References Cited

U.S. PATENT DOCUMENTS 4,860,201 A * 8/1989 Stolfo .................. G06F 9/4436
707/E17.104
5,287,532 A * 2/1994 Hunt ................... G06F 15/8023
712/10
(Continued)

FOREIGN PATENT DOCUMENTS

CN 101907989 A 12/2010
CN 102402487 A 4/2012
(Continued)

OTHER PUBLICATIONS

Funke, F. A., "Adaptive Physical Optimization in Hybrid OLTP & OLAP Main-Memory Database Systems", Feb. 25, 2015, Munich Technical Univeristy.*

(Continued)

*Primary Examiner* — Apu M Mofiz
*Assistant Examiner* — Sheryl L Holland
(74) *Attorney, Agent, or Firm* — Huawei Technologies Co., Ltd.

(57) ABSTRACT

A system is provided for creating selective snapshots of a database that is stored as one or more segments, wherein a segment comprises one or more memory pages. The system includes a memory storage comprising instructions and one or more processors in communication with the memory. The one or more processors execute the instructions to determine whether a snapshot process is configured to access a selected segment of the one or more segments, assign a positive mapping status to an accessed segment for which the determining unit has determined that it is accessed by the snapshot process and to assign a negative mapping status to a non-accessed segment, and create a snapshot comprises a step of forking the snapshot process with an address space that comprises a subset of the one or more segments.

26 Claims, 5 Drawing Sheets

(51) Int. Cl.
*G06F 16/28* (2019.01)
*G06F 16/23* (2019.01)
*G06F 16/2453* (2019.01)

(52) U.S. Cl.
CPC ........ *G06F 16/2308* (2019.01); *G06F 16/283* (2019.01); *G06F 16/2379* (2019.01); *G06F 16/24542* (2019.01); *G06F 2201/80* (2013.01); *G06F 2201/84* (2013.01); *G06F 2212/1024* (2013.01)

(56) References Cited

U.S. PATENT DOCUMENTS

| | | | | |
|---|---|---|---|---|
| 5,687,343 | A * | 11/1997 | Fecteau | G06F 12/0292 711/202 |
| 5,835,964 | A * | 11/1998 | Draves | G06F 12/1036 711/207 |
| 6,430,670 | B1 * | 8/2002 | Bryg | G06F 12/1036 711/205 |
| 8,327,187 | B1 * | 12/2012 | Metcalf | G06F 13/4068 714/10 |
| 8,745,311 | B2 * | 6/2014 | Tzeng | G06F 12/08 711/103 |
| 9,063,866 | B1 * | 6/2015 | Tati | G06F 12/10 |
| 9,658,878 | B2 * | 5/2017 | Ports | G06F 9/461 |
| 9,753,854 | B1 * | 9/2017 | Bao | G06F 12/0844 |
| 2002/0133678 | A1 * | 9/2002 | Mathews | G06F 9/5016 711/153 |
| 2003/0093647 | A1 * | 5/2003 | Mogi | G06F 17/3048 712/1 |
| 2004/0083345 | A1 * | 4/2004 | Kim | G06F 11/1466 711/162 |
| 2005/0193160 | A1 * | 9/2005 | Bhatt | G06F 12/0897 711/3 |
| 2006/0218364 | A1 | 9/2006 | Kitamura | |
| 2008/0120459 | A1 * | 5/2008 | Kaneda | G06F 11/1451 711/112 |
| 2008/0270739 | A1 | 10/2008 | Hamilton et al. | |
| 2010/0287347 | A1 * | 11/2010 | Cameron | G06F 12/109 711/162 |
| 2010/0287356 | A1 * | 11/2010 | Cameron | G06F 12/1027 711/207 |
| 2011/0125974 | A1 * | 5/2011 | Anderson | G06F 12/084 711/153 |
| 2011/0138123 | A1 * | 6/2011 | Gurajada | G06F 17/30595 711/118 |
| 2012/0066263 | A1 * | 3/2012 | Wildermuth | G06F 17/30563 707/792 |
| 2012/0323970 | A1 * | 12/2012 | Larson | G06F 17/30949 707/800 |
| 2013/0073513 | A1 * | 3/2013 | Kemper | G06F 17/30587 707/600 |
| 2013/0138894 | A1 * | 5/2013 | Loh | G06F 12/0888 711/144 |
| 2013/0332660 | A1 * | 12/2013 | Talagala | G06F 12/0246 711/103 |
| 2014/0089271 | A1 * | 3/2014 | Al-Otoom | G06F 9/44 707/690 |
| 2014/0095438 | A1 * | 4/2014 | Marwah | G06F 17/30073 707/639 |
| 2014/0283040 | A1 * | 9/2014 | Wilkerson | G06F 21/52 726/22 |
| 2014/0351239 | A1 * | 11/2014 | Davis | G06F 17/30483 707/718 |
| 2015/0113218 | A1 | 4/2015 | Shi et al. | |
| 2015/0363113 | A1 * | 12/2015 | Rahman | G06F 3/0653 707/718 |
| 2016/0210080 | A1 * | 7/2016 | Frank | G06F 3/061 |
| 2016/0283127 | A1 * | 9/2016 | Stabrawa | G06F 12/10 |
| 2017/0052742 | A1 * | 2/2017 | Hassan | G06F 12/0238 |
| 2017/0153987 | A1 * | 6/2017 | Gaonkar | G06F 12/145 |

FOREIGN PATENT DOCUMENTS

| | | |
|---|---|---|
| CN | 102906743 A | 1/2013 |
| CN | 103180852 A | 6/2013 |
| JP | 2006268830 A | 10/2006 |
| JP | 2013531835 A | 8/2013 |
| RU | 2325690 C1 | 5/2008 |
| WO | 2011/144382 A1 | 11/2011 |
| WO | 2015/100718 A1 | 7/2015 |
| WO | 2016/161810 A1 | 10/2016 |
| WO | 2016/161811 A1 | 10/2016 |

OTHER PUBLICATIONS

S. Peter, "Resource Management in a Muliticore Operating System", 2012, Doctoral Dissertation, Universitat Oldenburg.*
Linux.die.net, "madvise(2)", Mar. 22, 2013, extracted using webarchive Dec. 22, 2017, https://linux.die.net/man/2/madvise.*
Kimura, "Foedus: OLTP Engine for a Thousand Cores and NVRAM", Jun. 4, 2015, SIGMOD, ACM.*
Gorman et al., "Performance Characteristics of Explicit Superpage Support", 2010, ACM.*
Pillmeier et al., "Design alternatives for barrel shifters", 2002, Proc. SPIE Advanced Signal Processing Algorithms Architectures and Implementations.*
I. Wienand, "Transparent Large-Page Support for Itanium Linux", 2008, Masters Thesis, School of Computer Science and Engineering the University of New South Wales.*
F. Funke, "Adaptive Physical Optimization in Hybrid OLTP & OLAP Main-Memory Database Systems", Feb. 25, 2015, Dissertation, Technical University of Munich.*
Accetta et al., "Mach: A New Kernel Foundation for UNIX Development", 1986.*
Smith, J.M. et al. "Effects of copy-on-write Memory Management on the Response Time of UNIX fork Operations," Computing Systems1(3):255-78, Jun. 21, 1988, XP000747233.
Alfons Kemper et al., "HyPer: A Hybrid OLTP & OLAP Main Memory Database System Based on Virtual Memory Snapshots," IEEE ICDE Conference, 2011, pp. 195-206.
"UNIX man pages, madvise (2)" Linux Programmer's Manual, Retrieved from the Internet: http://www.astro.rug.nl/cgi-bin/man-cgi/?madvise+2. Apr. 30, 2008, total 3 pages, XP055221661.
Carlos Villavieja et al., "DiDi: Mitigating the Performance Impact of TLB Shootdowns Using a Shared TLB Directory," International Conference on Parallel Architectures and Compilation Techniques, IEEE Computer Society, 2011, pp. 340-349.
Henrik Muhe et al., "How to Efficiently Snapshot Transactional Data: Hardware or Software Controlled?" Proceedings of the Seventh International Workshop on Data Management on New Hardware (DaMoN 2011), Athens, Greece, Jun. 13, 2011, pp. 17-26, XP058003392.
Bogdan F. Romanescu et al., "UNified InstructioniTranslation/Data (UNITD) Coherence: One Protocol to Rule Them All," High Performance Computer Architecture (HPCA), 2010 IEEE 16th International Symposium, total 12 pages (2010).
Austin T. Clements et al., "RadixVM: Scalable address spaces for multithreaded applications," Eurosys'13, Prague, Czech Republic, Apr. 15-17, 2013, total 14 pages.
Hector Garcia-Molina et al., In: Database Systems, The Complete Book Second Edition, Pearson Prentice Hall, Pearson Education, Inc., 2002, total 1240 pages.
Ashok Joshi et al., "Checkpointing in Oracle," Proceedings of the 24th VLDB conference, New York, NY, 1998, pp. 665-668.
Florian Andreas Funke et al. Adaptive Physical Qptimization in Hybrid OLTPandOLAP Main-Memory Database Systems, 2015. total 8 pages.
Mike Accetta et al. Mach: A New Kernel Foundation for UNIX Development, 1986. total 16 pages.
Matthew R. Pillmeier et al. Design alternatives for barrel shifters, Proceedings of SPIE vol. 4791 (2002). pp. 436-447.

* cited by examiner

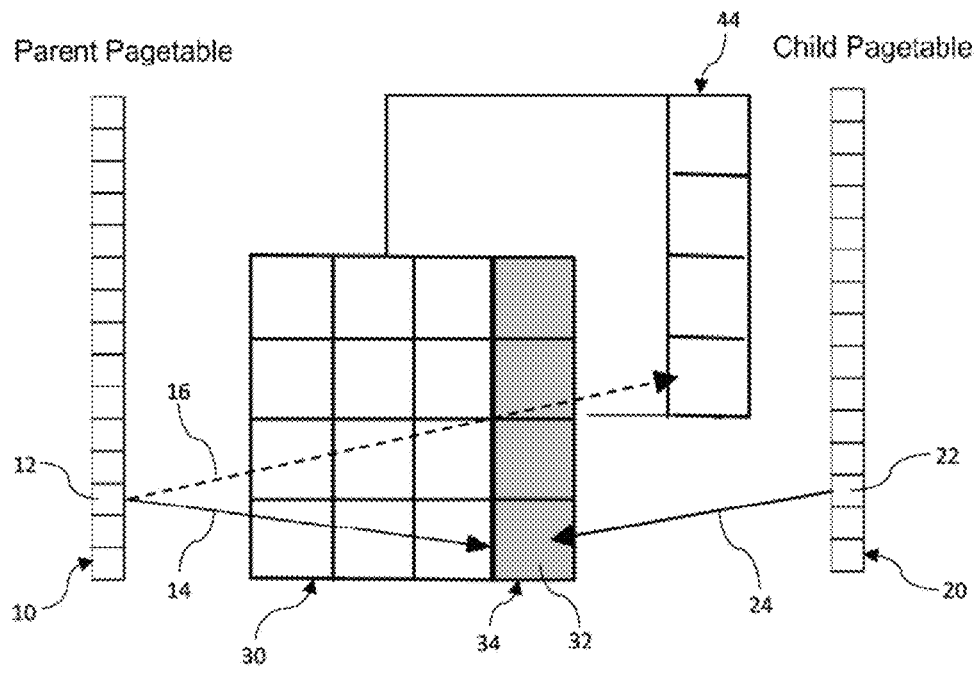
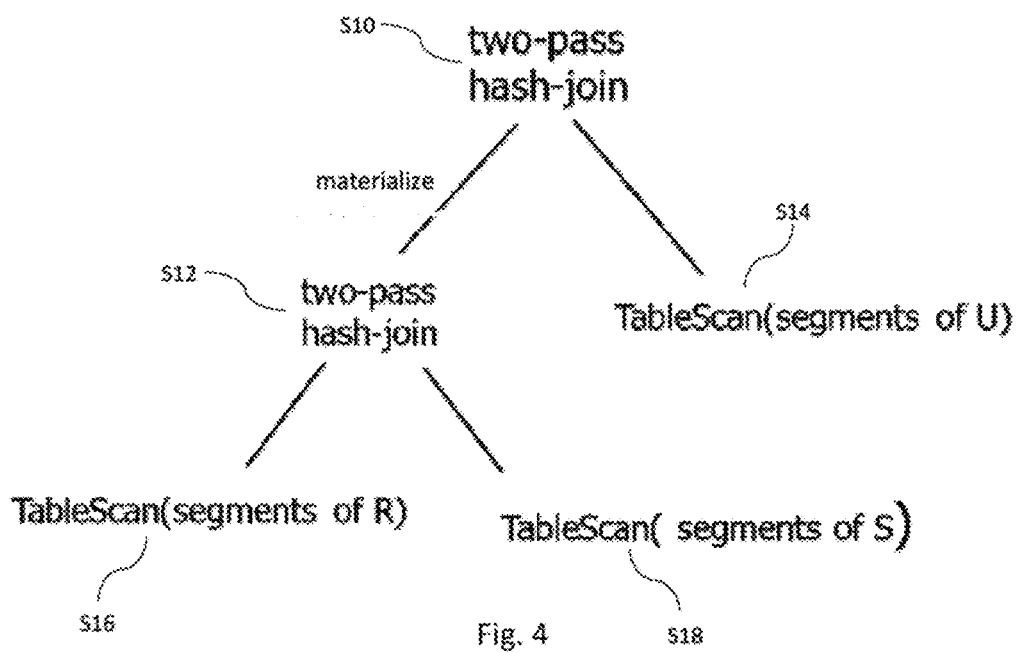

SYSTEM AND METHOD FOR CREATING SELECTIVE SNAPSHOTS OF A DATABASE

CROSS-REFERENCE TO RELATED APPLICATIONS

This application is a continuation of International Application No. PCT/EP2015/075405, filed on Nov. 2, 2015, which claims priority to European Patent Application No. EP15167493.4, filed on May 13, 2015. The disclosures of the aforementioned applications are hereby incorporated by reference in their entireties.

TECHNICAL FIELD

The present invention relates to a system and a method for creating snapshots of a database.

BACKGROUND

Some database operations involve forking a snapshot process for creating a snapshot of the database. For example, a hybrid online transaction processing and online analytical processing (OLTP-OLAP) database can utilize a fork system call for creating a snapshot process, which creates a consistent snapshot for the OLAP part for the duration of a long-running query execution.

A similar mechanism can be utilized for checkpointing a database. The checkpointing flushes a consistent database snapshot, in a snapshot process, to a persistent storage. This snapshot process can also be a long-running one, as it depends on the size of the snapshot and the speed of I/O. Various optimizations such as incremental checkpointing can be applied to track delta modifications of the database application state between consecutive checkpoints and to persist only the delta.

Generally, a snapshot, or a point-in-a-time copy in a child process, is maintained dynamically by means of copy-on-write (CoW) optimization: The fork system call will map the shared page frames in both processes as read-only, and only when a page is modified by a process, the kernel allocates a new page frame and copies the page data to the new frame. This creates additional overhead and performance degradation. In particular, in the above-mentioned and similar applications, the performance depends crucially on the overhead when maintaining the snapshot process.

The problem of mitigating the cost of maintaining a snapshot in order to improve systems' scalability, in particular due to copy-on write accesses, has been actively researched in academia. Yet, no production level system based on the research is known to be available.

SUMMARY

A system is provided for creating selective snapshots of a database stored as one or more segments, wherein a segment comprises one or more memory pages. The system comprises a memory storage comprising instructions and one or more processors in communication with the memory. The one or more processors execute the instructions to determine whether a snapshot process is configured to access a selected segment of the one or more segments, assign a positive mapping status to an accessed segment that it is accessed by the snapshot process and assign a negative mapping status to a non-accessed segment, and create a snapshot, comprising forking the snapshot process with an address space that comprises a subset of the one or more segments, wherein a non-mapped segment assigned a negative mapping status is not mapped in the address space.

A method is provided for creating selective snapshots of a database stored as one or more segments, wherein a segment comprises one or more memory pages. The method comprises a parent process determining whether a snapshot process is configured to access a selected segment of the one or more segments, the parent process assigning a positive mapping status to the segment if the segment is accessed by the snapshot process and the parent process assigning a negative mapping status to the segment if the segment is not accessed by the snapshot process, and the parent process creating a snapshot comprising forking the snapshot process, wherein a non-mapped segment assigned a negative mapping status is not mapped in an address space of the snapshot process.

A non-transitory computer-readable media is provided storing computer instructions, that when executed by one or more processors, cause the one or more processors to perform the steps of a parent process determining whether a snapshot process is configured to access a selected segment of the one or more segments, the parent process assigning a positive mapping status to the segment if the segment is accessed by the snapshot process and the parent process assigning a negative mapping status to the segment if the segment is not accessed by the snapshot process, and the parent process creating a snapshot comprising forking the snapshot process, wherein a non-mapped segment assigned a negative mapping status is not mapped in an address space of the snapshot process.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, but modifications of these embodiments are possible without departing from the scope of the present invention as defined in the claims.

FIG. 3 shows a schematic illustration of a parent pagetable and a child pagetable that comprise pointers to the same physical pages, wherein the effect of a copy-on-write is indicated in accordance with an embodiment.

FIG. 4 shows a schematic illustration of an example of a physical execution plan of two joins of three tables of a database in accordance with an embodiment.

DETAILED DESCRIPTION OF THE EMBODIMENTS

Provided herein are a system and a method for creating selective snapshots of a database that is stored as one or more segments, wherein a segment comprises one or more memory pages. Additionally provided is a computer-readable storage medium storing program code, the program code comprising instructions for carrying out a method for creating selective snapshots of a database that is stored as one or more segments, wherein a segment comprises one or more memory pages.

Figure 1:
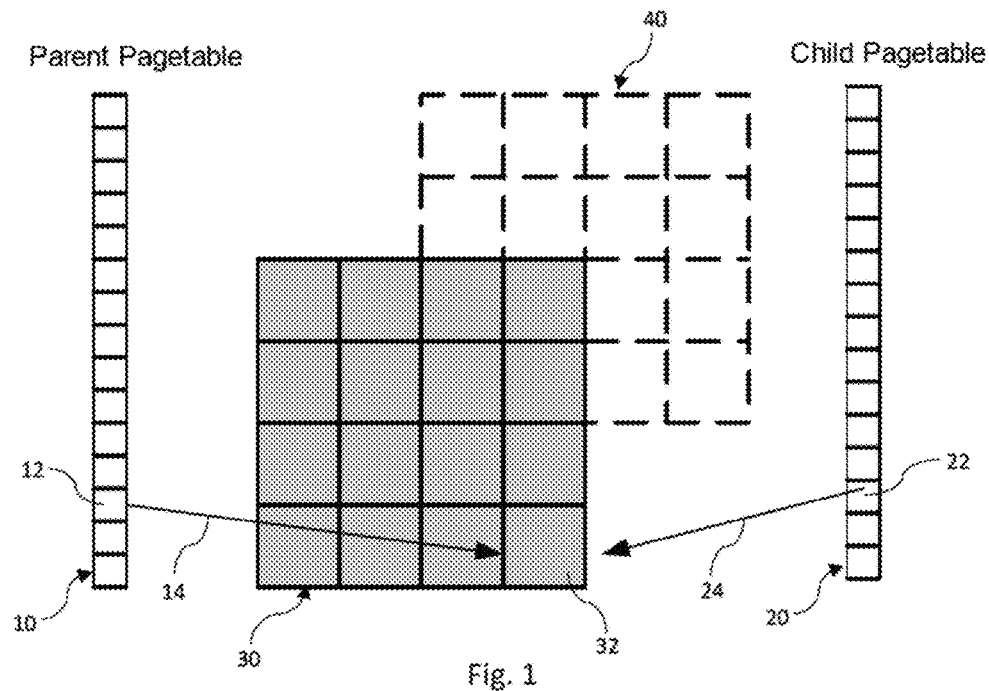
FIG. 1 shows a schematic illustration of a parent pagetable and a child pagetable that comprise pointers to the same physical pages.

FIG. 1 shows a schematic illustration of a parent pagetable 10 and a child pagetable 20, which is the pagetable of a snapshot process that has been forked from the parent process. The parent pagetable 10 comprises a first entry 12 that comprises a pointer 14 to a physical memory page 32. The child pagetable 20 comprises a second entry 22 that comprises a second pointer 24 to the same physical memory page 32. When the fork( ) system command is invoked, the entire parent address space 30 is set inheritable and is therefore mapped into the address space of the snapshot process, denoted by gray shading. After the fork( ) command, the child pagetable 20 points to the same physical pages as the parent pagetable 10. The dashed lines 40 indicate that up to the entire address space needs to be copied.

When the entire parent process address space is inherited across fork( ), each of its pages is subject to copy-on-write, regardless of the child accessing them.

Figure 2:
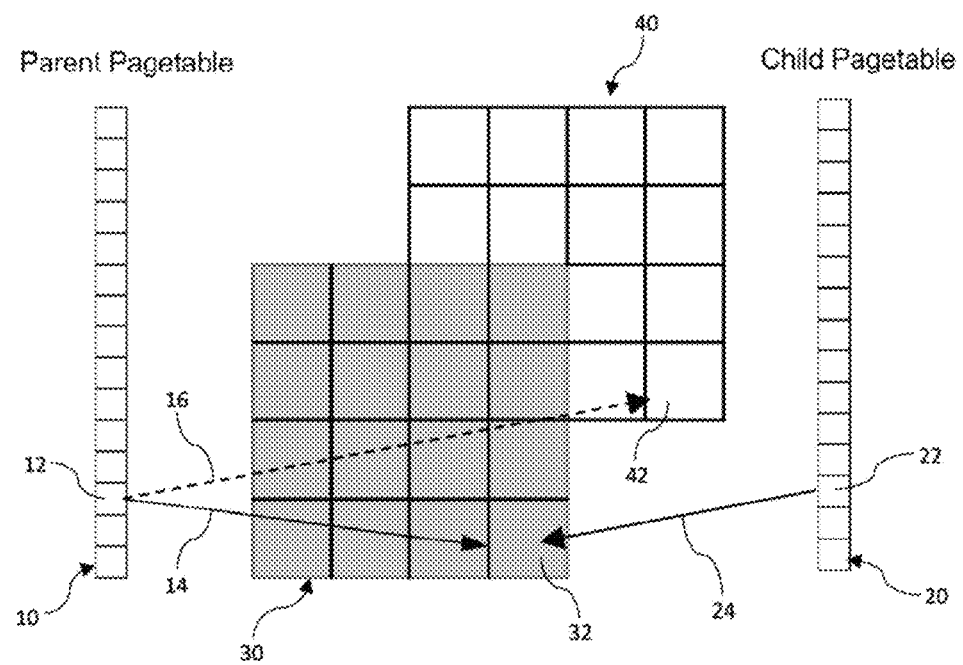
FIG. 2 shows a schematic illustration of a parent pagetable and a child pagetable that comprise pointers to the same physical pages, wherein the effect of a copy-on-write is indicated.

FIG. 2 illustrates the scenario when the parent process writes on the physical memory page 32. When all of the parent address space is inherited, the write to the parent's page, whether the child accesses the page or not, triggers a copy-on-write to a newly allocated memory page 42. Once the memory page has been copied to the new location 42, the pointer 14 in the first entry 12 in the parent pagetable 10 is updated to new pointer 16, which points to the newly allocated memory page.

Over a longer runtime of the parent process, subsequent writes of the parent process will trigger more and more copy-on-write allocations of new memory pages. These new memory pages are indicated with reference number 40 in FIG. 2. With a uniform write distribution and a long running child process, most of the pages in the parent will be copied—with the corresponding overhead.

The duration of the fork system call is proportional to the number of PTEs (page-table entries) in the page table of the parent process that are copied to the child's page table. A large in-memory dataset thus incurs a significant response-time spike during the fork, as typically the OLTP processing needs to be suspended for the duration of the fork system call.

Furthermore, fork( ) requires supplying enough free page frames. For example, if the huge Linux TLB Copy-on-write page fault handler does not find a new page frame, the page fault handler silently marks the child's page as unmapped, and the subsequent child's page access will terminate the process. Anticipating and preventing this situation is prohibitively hard.

A multitude of copy-on-write steps entail significant direct and indirect overhead, as follows.

In general, the copy-on-write page fault overhead is not scalable, since it increases with the number of cores due to the need to flush the TLBs on all the cores, see e.g. the TLB shootdown procedure. That opposes the claim that the OLTP performance can be increased further by utilizing more threads on a proportionally partitioned application state.

The number of copy-on-writes encountered in the parent process is proportional to the distribution of writes in the parent during the lifetime of the child process, regardless whether the child accesses the pages or not, e.g., with a long enough running child process and uniform write distribution in the parent all of its address space will be copied.

An update to a row in the column-store database entails write to a number of pages subject to copy-on-write that can be as many as the number of modified columns in the row. Thus the latency of update/insert operation is costly and highly variable.

FIG. 3 illustrates how the system and method according to the present invention overcome the above limitations. When forking the child process, only a subset of the address space of the parent process is inherited by the child process (wherein the child process can be e.g. a snapshot process). Only the shaded area 34 in the parent address space 30 is set as inheritable, based on the information regarding which data sets the child process needs for its execution. Therefore, the copy-on-write happens only for writes that occur to memory pages in the shaded area 34, if ever. The rest of the pages in the parent address space 30 are not subject to copy-on-write. This corresponds to a much smaller overall memory area 44 that may need to be copied with copy-on-write.

FIG. 4 illustrates an example of a physical execution plan of two joins of three tables R, S, and U. The physical execution plan includes the designation of the segments that the query operates on.

In particular, the physical execution plan includes a step S16 of performing a TableScan of the segments of the table R, and a step S18 of performing a TableScan of the segments of the table S. Subsequently, in step S12, a hash-join is performed on a materialized result of step S16 and S18, and in step S14 a TableScan is performed on segments of table U. Finally, on the results of the two-pass hash-join of step S12, in step S10 a TableScan is performed on the materialized result of steps S14 and S12.

Before creating the snapshot process, which is configured to execute the query, the query planner requests the snapshot manager to set the segments referenced in the physical plan as inheritable for the snapshot process.

In an embodiment of the invention, the system comprises an OLAP query planner module that determines which segments are required in the snapshot process that executes the query. Similarly, the checkpointer module determines the segments needed in the incremental checkpointing algorithm executed in the checkpointer child process.

At initialization all the database segments are set as not inheritable. The same is true when a new segment is inserted in the database.

The OLAP query planner module accepts OLAP SQL query statements, which it parses, analyses and rewrites, transforming the query parse tree using the database metadata, into a physical execution plan, e.g., a tree of operator function calls and their arguments.

The checkpointer module runs an incremental checkpointing algorithm. The time is divided into checkpoint intervals, when at each end of an interval a snapshot constituting the memory segments that were modified throughout the interval is taken by requesting the snapshot manager to set the segments as inheritable and call fork( ). The child checkpointer process outputs these segments to the disk. The child process returns a success status if all the segments were persisted successfully. Otherwise, the checkpointer module will accumulate the segments that failed to be persisted in previous intervals, with the ones modified throughout the current interval in the same snapshot to be persisted at the end of the current interval.

Figure 5:
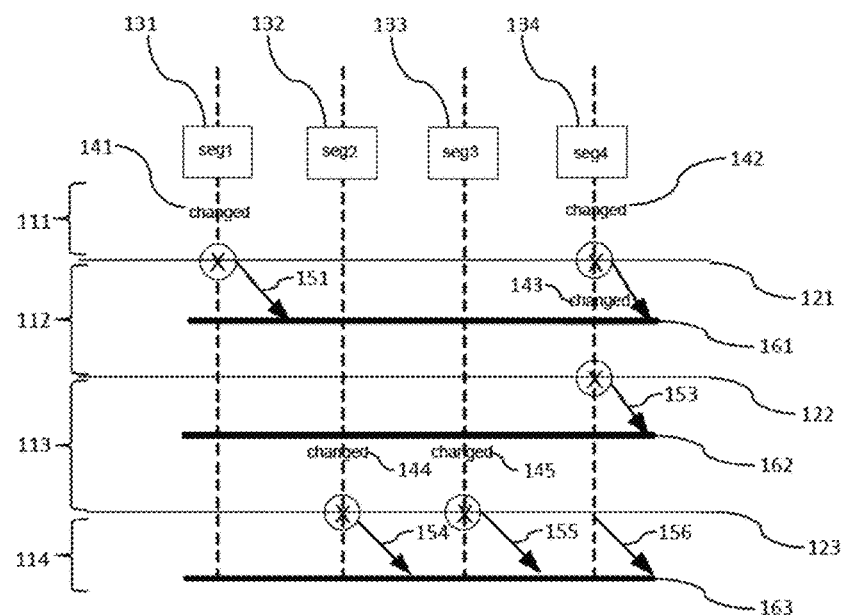
FIG. 5 shows a schematic illustration of a method of determining segments that are accessed by a snapshot process of a checkpointing method in accordance with an embodiment.

FIG. 5 provides an illustration of a method for checkpointing across several checkpoint intervals. A plurality of four objects 131, 132, 133 and 134 are tracked over four time intervals. The first, second and third time intervals are indicated with reference numbers 111, 112, and 113 in FIG. 5. The first time interval 111 precedes the first checkpoint 121. The second and third time intervals 112, 113 are defined as the intervals between first, second and third checkpoints 121, 122, and 123. The fourth time interval 114 comes after the third checkpoint 123. The first and fourth objects 131, 134 are changed (indicated with reference numbers 141, 142) in the first interval 111. The fourth object is changed 143 again in the second interval 112. In the third interval 113, the second and third object 132, 133 are changed 144, 145.

In the first time interval 111 (that ends at the time of the first checkpoint 121), the change sets consist of the first and fourth object 131, 134, i.e., the objects that were modified before the first checkpoint 121. At the time of the first checkpoint (i.e., when the second time interval is started) the objects are marked as changed relatively to the first checkpoint. The change set (comprising the first and fourth object 131, 134) is persisted successfully during the second time interval.

On the outset of the third time interval the change set consisting of the fourth object 134 is detected, i.e., it is detected that the fourth object 134 has been modified between the first and second checkpoints 121, 122. It is attempted to flush the second change set to disk. In the example, the flush attempt may result (for some unknown reason) in a disk write failure. In the fourth time interval 114, the computed change set consists of the second, third and fourth objects 132, 133, and 134. This change set results from the union of the fourth object 134 that failed to persist in the third time interval 113 and the change set consisting of the second and third objects 132, 133 that are detected as changed in the third time interval 113.

In general, applying the 'separation of concerns' concept, the method of snapshot capture needs not be of the checkpointing method's concern, as long as a consistent immutable replica of the state of the objects is created.

At the outset of a new checkpoint, the status variables of the objects that have changed relative to the last checkpoint need to be retained, together with the marking of all the objects as unchanged for the duration of the forthcoming checkpoint, all these in the presence of multiple parallel updates.

In a preferred embodiment of the invention, a system for creating selective snapshots of a database in accordance with the present invention comprises a snapshot manager which is responsible for managing snapshots for both an OLAP query planner module and for a checkpointing module.

Figure 6:
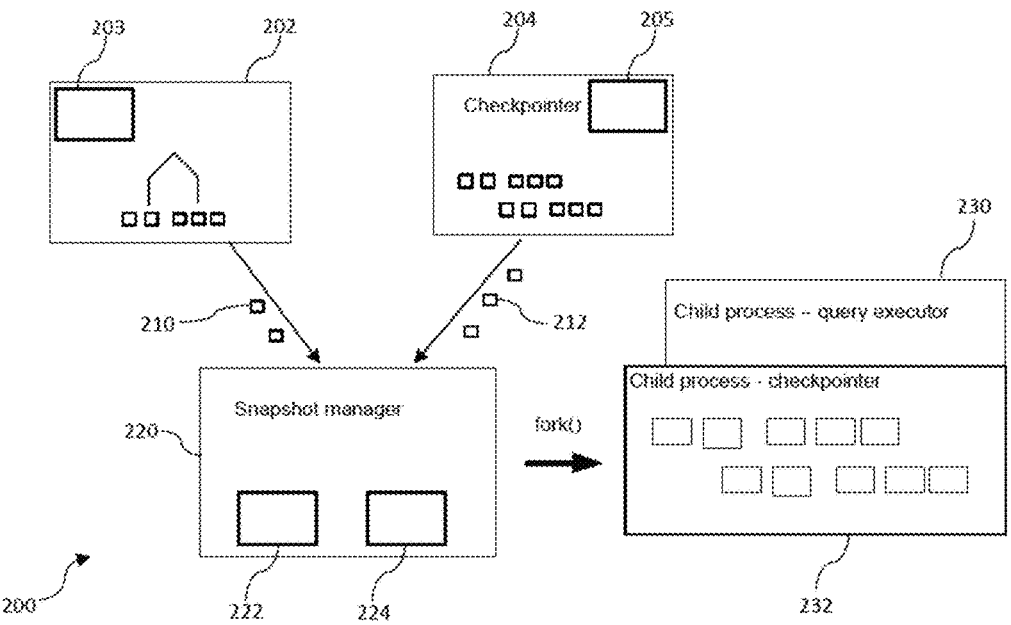
FIG. 6 shows a schematic illustration of a system for creating selective snapshots of a database in accordance with an embodiment.

FIG. 6 illustrates a system 200 comprising a query planner module 202, a checkpointing module 204, and a snapshot manager 220. The query planner module 202 comprises a first determining unit 203 for determining which segments will be accessed by a query executor process 230. The query planner module 202 is configured to pass these segments 210 that are accessed by the query executor process 230 to the snapshot manager 220. Similarly, the checkpointing module 204 comprises a second determining unit 205 for determining which segments will be accessed by a checkpointing process 232. The checkpointing module 204 is configured to pass segments 212 to the snapshot manager 220. The query executor process 230 and the checkpointer process 232 are snapshotting processes.

The snapshot manager 220 comprises an assigning unit 222 and a snapshot unit 224.

The embodiment further employs the following optimization in the snapshot manager 220 to avoid setting segment's inheritable status by means of a madvise( ) system call if it is already set correctly.

The query planner module 202 is configured to determine the segments appearing in its physical plan. The checkpointing module 204 tracks the segments changed in the checkpointing interval. Each of them in its turn passes its segments to the snapshot manager 220.

The snapshot manager 220 maintains a set $A_n$ to remember which segments were set as inheritable at the n-th fork. Initially $A_0=\{\ \}$, and all the memory segments in the database are set to not inheritable. Upon the outset of a new child process n+1, if $A_{n+1}$ is the set of segments needed in the new child process, then the set $A_n$-$A_{n+1}$ comprises the segments that need not be inheritable, and thus madvise( ) is called on each of them with the flag MADV_DONTFORK. The set $A_{n+1}$-$A_n$ includes the new required segments that must be set inheritable and madvise( ) is called with the flag MADV_NORMAL on each of them. Finally, the fork( ) system call is invoked.

In a preferred embodiment, a segment structure includes the following members: an address member, which holds the address of the allocated page range, a size member, which holds the size of the segment, and a status variable called inheritable_status, which is a 32-bit integer initialized to zero. The snapshot manager maintains a 32-bit integer mask variable called inheritable_mask, used to mark and test segments' inheritable_status. The inheritable_mask variable is set to a value of one upon initialization. The snapshot manager exports interfaces through which segments can be set as inheritable, and fork( ) is called. Specifically, the snapshot manager exports snapshot_init_begin( ), which rotates left the inheritable_mask, to be used to mark the segments in the snapshot, snapshot_init_segment(segment) to set the segment as inheritable, and finally snapshot_init_end( ), which actually calls fork( ).

In embodiments of the invention, the data structure implementing the set A can be a hash table.

In embodiments of the invention, the snapshot manager 220 can provide an interface with a function for initializing the creation of a new snapshot process, a function for adding segments and/or a function for finalizing the creation of the snapshot process.

Figure 7A:
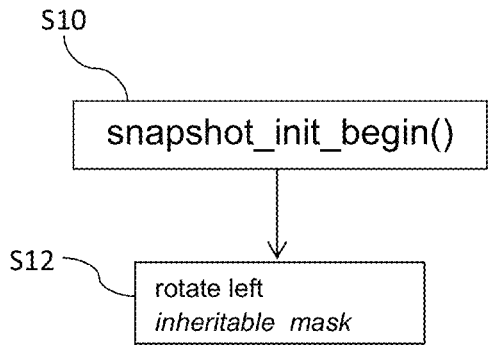
FIG. 7A shows a flow chart of a routine for beginning the initialization of a new snapshot process.
Figure 7B:
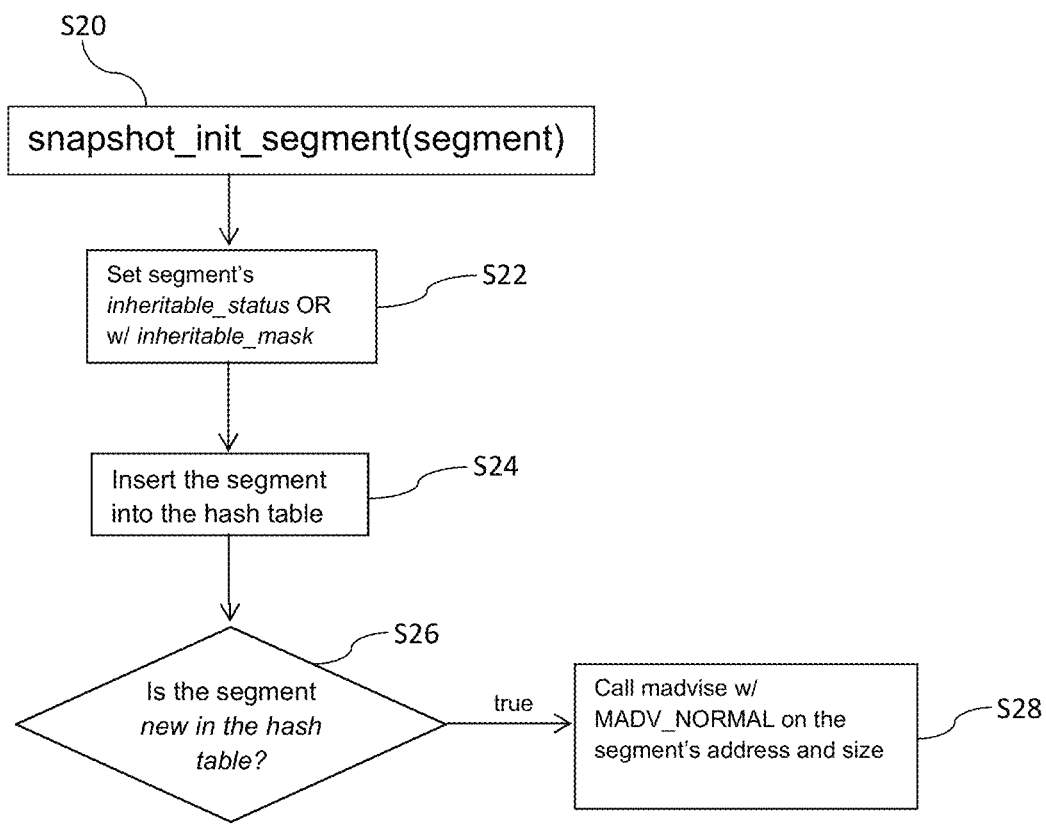
FIG. 7B shows a flow chart of a routine for adding segments with positive mapping status.
Figure 7C:
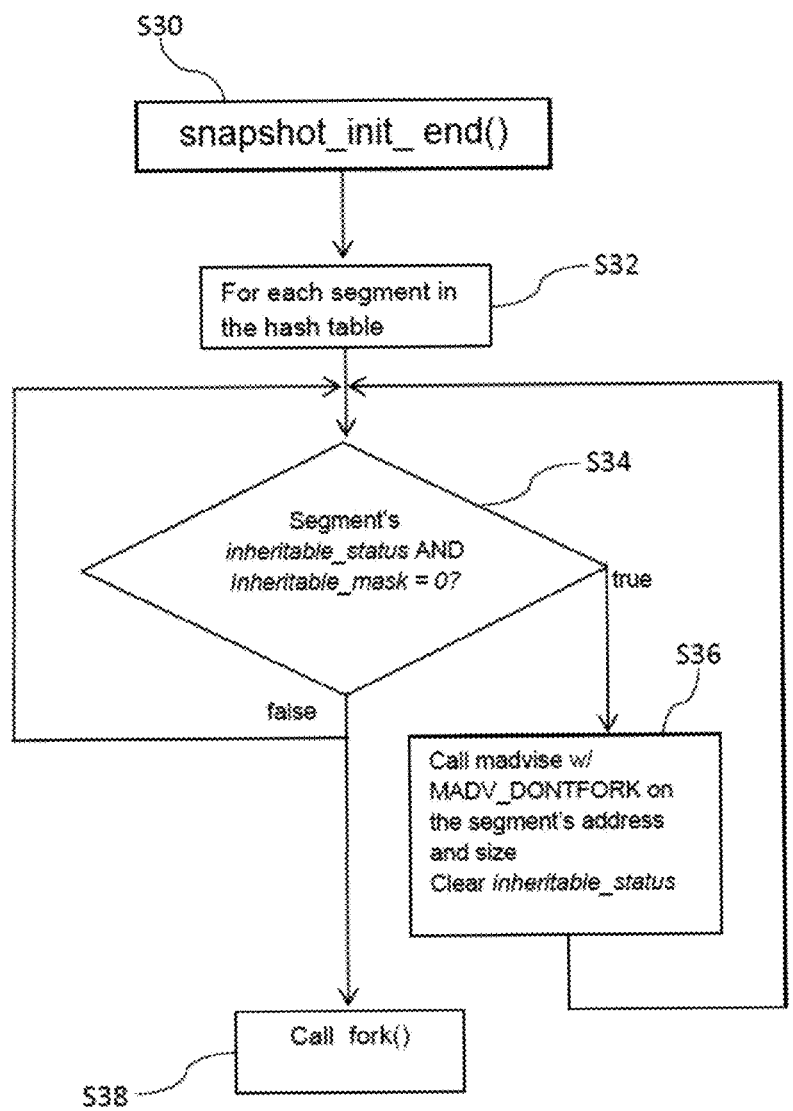
FIG. 7C shows a flow chart of a routine for finalizing the initialization of a new snapshot process.

FIGS. 7A to 7C show flow charts related to beginning the creation a new snapshot (FIG. 7A), adding a segment to the hash table (FIG. 7B), and finalizing the creation of a new snapshot (FIG. 7C).

In FIG. 7A, upon initialization, the hash table is empty. Upon forking a new child process, the function snapshot_init_begin( ) is called in step S10, where in step S12 the inheritable mask is rotated one bit left.

In FIG. 7B, a segment that is required in the child can be added to the snapshot by means of invoking the function snapshot_init_segment(segment) in step S20. In a first step S22 of this function, the segment is marked by setting its inheritable_status to the value of the inheritable_mask. Afterwards, in step S24, the segment is searched in the hash table. In step S26, if the segment is not in the table, then in step S28 the segment is inserted, followed by calling madvise( ) with MADV_NORMAL on the memory region of the segment. Otherwise, in step S26, if the segment is already in the hash table, no further action on this segment is required.

In FIG. 7C, once all required segments are in the hash table, the function snapshot_init_end( ) can be invoked in step S30. Then, the hash table is traversed in step S32, testing each segment's inheritable_status in step S34, using a bitwise AND with inheritable_mask. If the result is zero (i.e., "true"), the segment is removed along with clearing its inheritable_status and calling madvise with MD_DONT-FORK on its memory region. Otherwise, if the result of testing each segment's inheritable_status in step S34 is non-zero (i.e., "false"), then fork( ) is called. As a further optimization, the removal of unneeded segments can be done when they are encountered while searching for a required segment.

The objective of the present invention is to provide a system and a method for creating selective snapshots of a database that is stored as one or more segments, wherein a segment comprises one or more memory pages, wherein the system and the method overcome one or more of the above-mentioned problems of the prior art.

A first aspect provides a system for creating selective snapshots of a database stored as one or more segments, wherein a segment comprises one or more memory pages, the system comprising a memory storage comprising instructions and one or more processors in communication with the memory. The one or more processors execute the instructions to determine whether a snapshot process is configured to access a selected segment of the one or more segments, assign a positive mapping status to an accessed segment accessed by the snapshot process and assign a negative mapping status to a non-accessed segment, and create a snapshot, comprising forking the snapshot process with an address space that comprises a subset of the one or more segments, wherein a non-mapped segment assigned a negative mapping status is not mapped in the address space.

The system of the first aspect takes advantage of the knowledge regarding which memory subsets are accessed by the snapshot process. In embodiments of the invention, the one or more processors execute the instructions to set only the needed segments as mapped in the snapshot process. When the snapshot process runs, it finds only the mapped segments mapped in its address space. In other embodiments, all segments of the parent process are inherited by the snapshot process, but when the snapshot process is done using a segment, the snapshot process may un-map the segment. At the same time, a write in a parent process triggers copy-on-write only on the segment that is mapped in the snapshot process at that time.

Since the rest of the segments have a negative mapping status, i.e., are not set to be mapped in the address space of the snapshot process, they are not part of the snapshot address space at all, and subsequently are not subject to copy-on-write if being written to in the parent process. The write operation modifies these segments in-place, as if no snapshot process existed. As a result, the number of copy-on-writes that the parent undergoes can be reduced by several orders of magnitude.

The system according to the first aspect can utilize the knowledge with regard to which memory regions of the database are read by a snapshot consumer and snapshot these and only these memory regions. Furthermore, the snapshot consumer may relinquish its hold of the snapshotted regions or a part of the snapshotted regions in order to reduce the costs of run-time maintenance of the snapshots, i.e., the copy-on-write.

In the case of a fork-based snapshot technique, a madvise( ) system call can be invoked for each memory region to set a corresponding mapping status in the snapshot process and a munmap( ) system call can be invoked to relinquish the hold of a region in the snapshot process. In particular, the mapping status can be an inheritable_status, i.e., a status that indicates whether a segment is mapped into the address space of a newly created process.

In embodiments of the invention, a segment comprises one or more memory pages that are located at contiguous locations in memory.

The system of the first aspect can result in a significant reduction in the number of copy-on-writes encountered in the parent process since only the pages that are due to be accessed by the snapshot process are copied if the parent modifies them.

The system of the first aspect can also result in reduced fork times, since a much smaller proportion of page table entries are required to be copied to the snapshot page table.

Because of the reduced number of copy-on-writes, in embodiments of the first aspect the system can provide short and uniform row update latencies.

In further embodiments, a system according to the first aspect can achieve a reduced size of pools of reserved page frames to support the needed use-cases, and in general, achieves much reduced system memory pressure. Therefore, in some embodiments, due to the reduced memory pressure and more light-weight snapshot creation effort, the database is able to afford more frequent and long-running snapshot processes.

In a first implementation of the system according to the first aspect, the one or more processors execute the instructions to determine whether the snapshot process is configured to access the selected segment before execution of the snapshot process is started.

According to the first implementation, the one or more processors execute the instructions to decide which segments should be inherited, i.e., mapped into the address space of the newly created snapshot process. Hence, the snapshot process can be started with only those segments mapped into its address space that are required during the execution of the snapshot process. Determining the segments that the snapshot process requires before starting the snapshot process can has the advantage that unmapping of unneeded segments during execution of the snapshot process can be avoided.

In a second implementation of the system according to the first aspect, the one or more processors execute the instructions to determine during execution of an active snapshot process whether the active snapshot process is configured to access the selected segment during a remaining execution time of the active snapshot process.

The first and second implementation can be combined, i.e., it can be determined before execution which segments will be accessed at all by the snapshot process, and during execution it can be determined which segments will still be accessed in the remaining execution time. For example, it can be that a specific segment is accessed only once by the snapshot process during its execution. Therefore, after this one access the one or more processors execute the instructions to determine that the specific segment will not be accessed again and the one or more processors execute the instructions to assign a negative mapping status to the specific segment even though it had previously (before execution of the snapshot process started) assigned a positive mapping status to the specific segment.

In embodiments of the second implementation, the one or more processors execute the instructions to unmap one or more segments, for which the one or more processors have determined that they will not be accessed by the snapshot process in the remaining execution time of the snapshot process, from the address space of the snapshot process.

In a third implementation of the system according to the first aspect, the one or more processors execute the instructions to compile a physical execution plan to be executed by the snapshot process, wherein preferably the compiled physical execution plan comprises an unmap command for a segment at a position in the physical execution plan when the segment is no longer accessed during a remaining execution time of the physical execution plan. This has the advantage that a segment can be unmapped immediately when it is determined that it is no longer required in the snapshot process.

In a fourth implementation of the system according to the first aspect, assigning a positive mapping status to an accessed segment comprises a step of calling a madvise operating system function with arguments that comprise an address and a size of the accessed segment and a MADV_NORMAL parameter and/or wherein assigning a negative mapping status to a non-accessed segment comprises a step of calling a madvise operating system function with arguments that comprise an address and a size of the non-accessed segment and a MADV_DONTFORK parameter.

In embodiments, setting a positive or negative mapping status may comprise setting an "internal" variable to a value corresponding to a positive or negative mapping status and also invoking an operating system function such as madvise( ) in order to set a positive or negative mapping status at the operating system level.

The madvise( ) operating system function is used to give advice or directions to the kernel about memory pages at a certain address range. Some predetermined parameters such as MADV_NORMAL, MADV_DOFORK or MADV_DONTFORK allow an application to tell the kernel how it expects to use some mapped or shared memory areas, so that the kernel can choose appropriate read-ahead and caching techniques. In particular, according to the fourth implementation of the system, invoking madvise( ) with the MADV_NORMAL parameter has the effect that the default treatment is used for this segment. For example, the snapshot process is created with the specific segment included in its address space.

If a segment comprises more than one memory page, the madvise( ) function can be invoked with the memory pages of the segment as arguments.

A second aspect refers to a method for creating selective snapshots of a database stored as one or more segments, wherein a segment comprises one or more memory pages, the method comprising a parent process determining whether a snapshot process is configured to access a selected segment of the one or more segments, the parent process assigning a positive mapping status to the segment if the segment is accessed by the snapshot process and the parent process assigning a negative mapping status to the segment if the segment is not accessed by the snapshot process, and the parent process creating a snapshot comprising forking the snapshot process, wherein a non-mapped segment assigned a negative mapping status is not mapped in an address space of the snapshot process.

The methods according to the second aspect of the invention can be performed by the system according to the first aspect of the invention. Further features or implementations of the method according to the second aspect of the invention can perform the functionality of the apparatus according to the first aspect of the invention and its different implementation forms.

In a first implementation of the method of the second aspect, assigning a positive mapping status to an accessed segment comprises setting a status variable of the accessed segment to the status variable OR-combined with a mask variable, inserting a pointer to the accessed segment in a hash table, and if the pointer is newly inserted in the hash table, setting a positive mapping status, wherein the parent process creating the snapshot comprises updating the mask variable wherein in particular updating the mask variable comprises a step of rotating bit values of the mask variable.

By keeping a hash table up-to-date with all accessed segments and determining whether a pointer to an accessed segment is newly inserted, unnecessary updates to the mapping status can be avoided. For example, a system command related to mapping or unmapping of a segment needs to be invoked only if the mapping status of this segment has changed.

In embodiments of the invention, the mask variable is a two-bit variable. In this way, one bit can correspond to a current time interval and the other bit can correspond to a previous time interval.

By updating a mask variable when a new snapshot process is created, and using the mask variable when setting a status variable of the segment, the method according to the first implementation can keep a record of the current and the previous mapping status of each segment. Thus, unnecessary invocations of operating system function related to a mapping status can be avoided.

In a second implementation of the method of the second aspect, creating the snapshot further comprises a step of setting for each segment in the hash table set a negative mapping status if the segment's status variable AND-combined with the mask variable is 0.

In particular, it can be determined whether the segment's status variable AND-combined with the mask variable is 0 for all bits of the result of AND-combination.

Accessing the mapping status variable of the segments using an AND-combination with the mask variable provides an efficient way of accessing only that bit of the mapping status that corresponds to the current position.

In a third implementation of the method of the second aspect, the method is a checkpointing method and the snapshot process is configured to write a selective snapshot of the database that comprises a subset of the one or more segments to a persistent storage. In a checkpointing method, the snapshot process will typically only write those segments of the database to a persistent memory that have changed in the last checkpointing interval (the "delta"). In some embodiments, the snapshot process therefore only needs to read each of the changed segments once. After the read access to a certain segment has been performed, no further accesses to this segment will be performed by the snapshot process, and a negative mapping status can be set.

For example, in cases where many segments have been changed in the last checkpointing interval, the method of the third implementation can provide a substantial reduction of copy-on-writes.

In a fourth implementation of the method of the second aspect, the parent process determining whether a snapshot process is configured to access a selected segment of the one or more segments comprises a step of determining whether the selected segment has been changed in a previous checkpoint interval. This provides a simple rule for determining that a segment will not be accessed by the snapshot process. Because the rule is relatively simple, there is very low computational overhead required for determining the non-accessed segments and setting a negative mapping status for them.

In a fifth implementation of the method of the second aspect, the method is a method for maintaining a hybrid online transaction processing (OLTP) and online analytical processing (OLAP) database system and the method comprises the parent process receiving an OLAP query, and the snapshot process executing the OLAP query.

Hybrid OLTP and OLAP database systems allow processing analytical queries directly on the transactional data. By offering arbitrarily current snapshots of the transactional data for OLAP, these systems enable real-time business intelligence. However, because executing an OLAP query in a hybrid system requires that a snapshot process is created, it is of particular importance that unnecessary copy-on-writes are avoided when creating the snapshot process.

In a sixth implementation of the method of the second aspect, the method further comprises a step of the parent process compiling the snapshot process based on the OLAP query. The compilation of the snapshot process can be partly based on knowledge which segments will be accessed by the snapshot process. This has the advantage that for example unmapping commands can be inserted at appropriate places in the compiled snapshot process.

In a seventh implementation of the method of the second aspect, the parent process determining whether a snapshot process is configured to access a selected segment comprises a step of the parent process creating a physical execution plan, wherein in particular the parent process assigns a positive mapping status to a referenced segment that is referenced in the physical execution plan.

A physical execution plan can comprise an ordered set of steps used to access data in a SQL relational database management system. In this way, it can be determined when the snapshot process requires access to which segments and for example unmapping commands that unmap unneeded segments from the address space of the snapshot process can be placed accordingly.

For a typical SQL query, there are a large number of alternative ways to execute the query, each corresponding to a different query execution plan. Typically, database management systems choose a preferred physical execution plan based on some performance criterion. In embodiments of the present invention, from a plurality of available physical execution plans, a preferred physical execution plan is selected based on when a negative mapping status can be set for segments of the snapshot process. For example, a physical execution can be selected as preferred physical execution plan if it can be determined that segments are not needed at earlier positions for this physical execution plan, and hence unmap commands can be invoked earlier.

In an eighth implementation of the method of the second aspect, the method further comprises the steps of determining a non-accessed segment that is no longer accessed by the snapshot process, and unmapping the non-accessed segment.

As outlined above, unmapping the non-accessed segment can be performed using a system command for unmapping of memory pages.

A third aspect of the invention refers to a computer-readable storage medium storing program code, the program code comprising instructions for carrying out the method of the second aspect or one of the implementations of the second aspect.

A third aspect refers to a non-transitory computer-readable media storing computer instructions, that when executed by one or more processors, cause the one or more processors to perform the steps of a parent process determining whether a snapshot process is configured to access a selected segment of the one or more segments, the parent process assigning a positive mapping status to the segment if the segment is accessed by the snapshot process and the parent process assigning a negative mapping status to the segment if the segment is not accessed by the snapshot process, and the parent process creating a snapshot comprising forking the snapshot process, wherein a non-mapped segment assigned a negative mapping status is not mapped in an address space of the snapshot process.

The foregoing descriptions are only implementation manners of the present invention, the protection of the scope of the present invention is not limited to this. Any variations or replacements can be easily made through a person skilled in the art. Therefore, the protection scope of the present invention should be subject to the protection scope of the attached claims.

The invention claimed is:

1. A device for creating selective snapshots of a database stored as one or more segments, wherein a segment comprises one or more memory pages, the device comprising:
   a memory storage comprising instructions and comprising an inheritable_status data structure; and
   one or more processors in communication with the memory, with the one or more processors executing the instructions to:
      determine, by a query planner module, whether a snapshot process is configured to access a selected segment of the one or more segments based on an inheritable_status information for the selected segment and carried in the one or more segments, with the inheritable_status information being received from the query planner module and stored in the inheritable_status data structure, with the inheritable_status information for the selected segment indicating the selected segment is inheritable and indicating data sets of the database the snapshot process needs for snapshot process execution;
      create a snapshot, comprising forking the snapshot process with an address space of the snapshot process that comprises a subset of the one or more segments, wherein a non-mapped segment assigned a negative mapping status is not mapped in the address space;
      determine whether the snapshot process is configured to access the selected segment before execution of the snapshot process has been started;
      determine during execution of an active snapshot process whether the active snapshot process is configured to access the selected segment during a remaining execution time of the active snapshot process; and
      compile a physical execution plan to be executed by the snapshot process.

2. The system of claim 1, wherein the compiled physical execution plan comprises an unmap command for a segment at a position in the physical execution plan when the segment is no longer accessed during a remaining execution time of the physical execution plan.

3. The system of claim 1, wherein assigning a positive mapping status to an accessed segment comprises a step of calling a madvise operating system function with arguments that comprise an address and a size of the accessed segment and a MADV_NORMAL parameter.

4. The system of claim 1, wherein assigning a negative mapping status to a non-accessed segment comprises a step of calling a madvise operating system function with arguments that comprise an address and a size of the non-accessed segment and a MADV_DONTFORK parameter.

5. The device of claim 1, with the inheritable_status data structure comprising a hash table.

6. The device of claim 1, with the one or more processors further executing the instructions to receive accessed segment information and maintain the accessed segment information in the inheritable_status data structure, with the maintaining comprising assigning a positive mapping status to an accessed segment configured to be accessed by the snapshot process and assigning a negative mapping status to a non-accessed segment configured to not be accessed by the snapshot process.

7. The device of claim 6, wherein the accessed segment information is received from a query planner module.

8. The device of claim 6, wherein the accessed segment information is received from a query planner module based on a query.

9. The device of claim 6, wherein the accessed segment information is maintained in the inheritable_status data structure by masking the accessed segment information into the inheritable_status data structure.

10. The device of claim 1, with the device comprising a snapshot manager in communication with a query planner module.

11. The device of claim 1, with the device comprising a snapshot manager in communication with a query planner module and a checkpointing module.

12. A method for creating selective snapshots of a database stored as one or more segments, wherein a segment comprises one or more memory pages, the method comprising:
   a parent process determining, by a query planner module, whether a snapshot process is configured to access a selected segment of the one or more segments based on an inheritable_status information for the selected segment, with the inheritable_status information being received from the query planner module and stored in an inheritable status data structure and carried in the one or more segments, with the inheritable status information for the selected segment indicating the selected segment is inheritable and indicating data sets of the database the snapshot process needs for snapshot process execution, before execution of the snapshot process has been started, and determining during execution of an active snapshot process whether the active snapshot process is configured to access the selected segment during a remaining execution time of the active snapshot process;
   the parent process creating a snapshot comprising forking the snapshot process, wherein a non-mapped segment assigned a negative mapping status is not mapped in an address space of the snapshot process; and
   the parent process creating a physical execution plan.

13. The method of claim 12, wherein the assigning the positive mapping status to an accessed segment comprises:
   setting a status variable of the accessed segment to the status variable OR-combined with a mask variable;
   inserting a pointer to the accessed segment in a hash table; and
   if the pointer is newly inserted in the hash table, setting a positive mapping status,
   wherein the parent process creating the snapshot comprises updating the mask variable comprising rotating bit values of the mask variable.

14. The method of claim 13, wherein creating the snapshot further comprises setting, for each segment in the hash table set, a negative mapping status if the segment status variable AND-combined with the mask variable is 0.

15. The method of claim 14, wherein the method comprises a checkpointing method and wherein the snapshot process is configured to write a selective snapshot of the database that comprises a subset of the one or more segments to a persistent storage.

16. The method of claim 15, wherein the parent process determining whether the snapshot process is configured to access the selected segment of the one or more segments comprises determining whether the selected segment has been changed in a previous checkpoint interval.

17. The method of claim 14, wherein the method comprises a method for maintaining a hybrid online transaction processing (OLTP) and online analytical processing (OLAP) database system, and wherein the method comprises:
   receiving an OLAP query; and
   the snapshot process executing the OLAP query.

18. The method of claim 17, further comprising the parent process compiling the snapshot process based on the OLAP query.

19. The method of claim 17, wherein the parent process assigns a positive mapping status to a referenced segment that is referenced in the physical execution plan.

20. The method of claim 14, further comprising:
   determining a non-accessed segment that is no longer accessed by the snapshot process; and
   unmapping the non-accessed segment.

21. The method of claim 12, with the inheritable_status data structure comprising a hash table.

22. The method of claim 12, further comprising:
   receiving accessed segment information; and
   maintaining the accessed segment information in the inheritable_status data structure, with the maintaining comprising assigning a positive mapping status to an accessed segment configured to be accessed by the snapshot process and assigning a negative mapping status to a non-accessed segment configured to not be accessed by the snapshot process.

23. The method of claim 22, wherein the accessed segment information is received from a query planner module.

24. The method of claim 22, wherein the accessed segment information is received from a query planner module based on a query.

25. The method of claim 22, wherein the maintaining the accessed segment information comprises masking the accessed segment information into the inheritable_status data structure.

26. A non-transitory computer-readable media storing computer instructions, that when executed by one or more processors, cause the one or more processors to perform the steps of:
   a parent process determining, by a query planner module, whether a snapshot process is configured to access a selected segment of one or more segments stored in a database based on an inheritable_status information for the selected segment, with the inheritable_status information being received from the query planner module and stored in an inheritable_status data structure and carried in the one or more segments, with the inheritable_status information for the selected segment indicating the selected segment is inheritable and indicating data sets of the database the snapshot process needs for snapshot process execution, before execution of the snapshot process has been started, and determining during execution of an active snapshot process whether the active snapshot process is configured to access the selected segment during a remaining execution time of the active snapshot process;

the parent process assigning a positive mapping status to the segment if the segment is accessed by the snapshot process and the parent process assigning a negative mapping status to the segment if the segment is not accessed by the snapshot process;

the parent process creating a snapshot comprising forking the snapshot process, wherein a non-mapped segment assigned a negative mapping status is not mapped in an address space of the snapshot process.

* * * * *